(12) United States Patent
Yang

(10) Patent No.: US 10,629,139 B2
(45) Date of Patent: Apr. 21, 2020

(54) BACKLIGHT MODULE AND CONTROL METHOD OF DISPLAY DEVICE

(71) Applicant: Wuhan China Star Optoelectronics Technology Co., Ltd., Wuhan, Hubei (CN)

(72) Inventor: Yong Yang, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 284 days.

(21) Appl. No.: 15/736,916

(22) PCT Filed: Nov. 21, 2017

(86) PCT No.: PCT/CN2017/112128
§ 371 (c)(1),
(2) Date: Dec. 15, 2017

(87) PCT Pub. No.: WO2019/085055
PCT Pub. Date: May 9, 2019

(65) Prior Publication Data
US 2020/0043425 A1 Feb. 6, 2020

(30) Foreign Application Priority Data

Oct. 31, 2017 (CN) .......................... 2017 1 1050565

(51) Int. Cl.
*G09G 3/34* (2006.01)
*G02F 1/1335* (2006.01)
(Continued)

(52) U.S. Cl.
CPC ..... *G09G 3/3413* (2013.01); *G02F 1/133603* (2013.01); *G09G 3/36* (2013.01);
(Continued)

(58) Field of Classification Search
USPC ........................................................ 345/691
See application file for complete search history.

(56) References Cited

U.S. PATENT DOCUMENTS 8,339,356 B2 12/2012 Utsumi et al.
2008/0180414 A1* 7/2008 Fung .................... G09G 3/3426
345/204
2013/0235095 A1* 9/2013 Cok ......................... G09G 5/02
345/694

FOREIGN PATENT DOCUMENTS

CN 1904697 A 1/2007
CN 103234149 A 8/2013
(Continued)

*Primary Examiner* — Deeprose Subedi
(74) *Attorney, Agent, or Firm* — Hemisphere Law, PLLC; Zhigang Ma

(57) ABSTRACT

The present invention provides a backlight module comprising a LED backlight source. The LED backlight source comprises at least two LED light source sets disposed alternatively; each LED light source set comprises red LED lights, green LED lights and blue LED lights arranged in array formation; and a color gamut of the red and green LED lights in two neighbored LED light source sets are different. The present invention further provides a control method of display device. The LED backlight source is controlled and a corresponded RGB grey level is output to the display device according to the percentage of the areas of the red and green pixels having color saturation value greater than the color saturation threshold. Comparing to the existed technology, uncomfortableness on watching red pixels and green pixels is reduced and comfort of human eyes while watching images with high color gamut is improved.

11 Claims, 2 Drawing Sheets

(51) Int. Cl.
    *G09G 3/36* (2006.01)
    *G02F 1/13357* (2006.01)
(52) U.S. Cl.
    CPC .......... *G02F 2001/133613* (2013.01); *G02F 2001/133624* (2013.01); *G09G 2320/0626* (2013.01); *G09G 2320/0666* (2013.01)

(56) References Cited

FOREIGN PATENT DOCUMENTS

| CN | 203223802 U | 10/2013 |
| CN | 203615191 U | 5/2014 |
| CN | 105575311 A | 5/2016 |
| CN | 105700230 A | 6/2016 |
| CN | 106782317 A | 5/2017 |

\* cited by examiner

BACKLIGHT MODULE AND CONTROL METHOD OF DISPLAY DEVICE

RELATED APPLICATIONS

The present application is a National Phase of International Application Number PCT/CN2017/112128, filed on Nov. 21, 2017, and claims the priority of China Application No. 201711050565.0, filed on Oct. 31, 2017.

FIELD OF THE DISCLOSURE

The disclosure relates to a display technical, and more particularly to a backlight module and control method of display device.

BACKGROUND

With the development of LCD panel technology, enhancement of panel color gamut has become an important direction in development of panel technology. Currently, the panel's color gamut has risen from 70% NTSC (National Television Standards Committee) to 95% NTSC and then to 120% NTSC. Most of the technical issues in backlight module and color resisting films have been overcome. However, when the color gamut is raised to 120% NTSC, many observers report a decrease in the human eye's comfort for images with pure colors. One possible explanation is that the pure color in high color gamut is beyond the natural color range and the human eye has not been exposed to this color, so that unfamiliar and uncomfortable would be felt. This also results in lower recognition of high gamut technology in the market. At present, there is no better solution to this problem.

SUMMARY

In order to overcome the shortcomings of the existed technology, the present invention provides a backlight module and control method of display device to decrease the color saturation value of green and red in a high color gamut display device and improve comfort of human eyes while watching the display device.

The present invention provides a backlight module, comprising a LED backlight source, wherein: the LED backlight source comprises at least two LED light source sets disposed alternatively; each LED light source set comprises red LED lights, green LED lights and blue LED lights arranged in an array formation; and a color gamut of the red LED lights in a selected one of the LED light source sets and the red lights in one of the LED light source sets neighboring to the selected LED light source set is different, and a color gamut of the green LED lights in the selected LED light source set and the green LED lights in the neighbored LED light source set is different.

Furthermore, the backlight source is composed of two LED light source sets.

Furthermore, wavelengths of corresponded red LED lights of the two LED light source sets are the same, wavelengths of corresponded green LED lights of the two LED light source sets are the same, half-peak widths of corresponded red LED lights of the two LED light source sets are different, and half-peak widths of corresponded green LED lights of the two LED light source sets are different.

Furthermore, the half-peak widths of the red LED lights and the green LED lights of one of the two LED light source sets are both less than the half-peak widths of the red LED lights and the green LED lights of another one of the two LED light source sets.

The present invention further provides a control method of display device, wherein the display device comprises the backlight module described above, and the control method comprises the steps of:

converting a RGB color space of a display image into a HSV color space;

setting a color saturation threshold $S_0$;

comparing a color saturation value of a display area of a red pixel in the display image with the color saturation threshold, and comparing a color saturation value of a display area of a green pixel in the display image with the color saturation threshold;

performing statistics on the display area of the red pixel and the display area of the green pixel when the color saturation value of the display area of the red pixel or the green pixel is greater than the color saturation threshold; and controlling the LED backlight source and outputting a RGB grey level to the display device in accordance with a percentage of the display areas of the red pixel and the green pixel with the color saturation value greater than the color saturation threshold.

Furthermore, when the percentage of the display areas of the red pixel and the green pixel is less than 10% of the display image, the RGB grey level corresponding to the display image is output directly and the LED backlight source is fully turned on.

Furthermore, when the percentage of the display areas of the red pixel and the green pixel is greater than 10% and less than 50% of the display image, the color saturation values of the display areas of the red pixel and the green pixel each with the color saturation value greater than the color saturation threshold are decreased gradually from a center position to boundaries of the display image, an adjusted RGB grey value corresponding to the display image with the decreased color saturation values of the display areas of the red pixel and the green pixel is calculated and outputted, and the LED backlight source is fully turned on.

Furthermore, when the percentage of the display areas of the red pixel and the green pixel is greater than 50% of the display image, the RGB grey level corresponding to the display image is output directly and two of the LED light source sets are turned on by only turning on the blue LED lights in one of the two LED light source sets and fully turning on another one of the two LED light source sets; wherein the half-peak widths of the red LED lights and the green LED lights of the LED light source set being fully turned on are greater than the half-peak widths of corresponded red LED lights and green LED lights of the LED light source set turning on only the blue LED lights, and driving currents of the red LED lights and green LED lights of the LED light source set being fully turned on are increased at the same time to increase luminance of the red LED lights and the green LED lights of the LED light source set being fully turned on.

Furthermore, the driving currents of the red LED lights and green LED lights of the LED light source set being fully turned on are increased at the same time to increase luminance of the red LED lights and the green LED lights of the LED light source set being fully turned on to at least two times normal luminance.

Furthermore, the color saturation threshold $S_0$ is 0.8.

Comparing with the existed technology, the present invention uses at least two LED light source set having three primary colors red, green and blue as the LED backlight source, performs statistics on the display area of the red pixel and the display area of the green pixel when the color saturation value of the display area of the red pixel or the green pixel is greater than the color saturation threshold, and controls the LED backlight source and adjusts the output RGB grey level in accordance with a percentage of the display areas of the red pixel and the green pixel with the color saturation value greater than the color saturation threshold, so as to reduce uncomfortableness on watching red pixels and green pixels and improve comfort of human eyes while watching images with high color gamut.

DETAILED DESCRIPTION OF PREFERRED EMBODIMENTS

The present invention will be further described in detail with reference to accompanying drawings and embodiments as follows.

Figure 1:
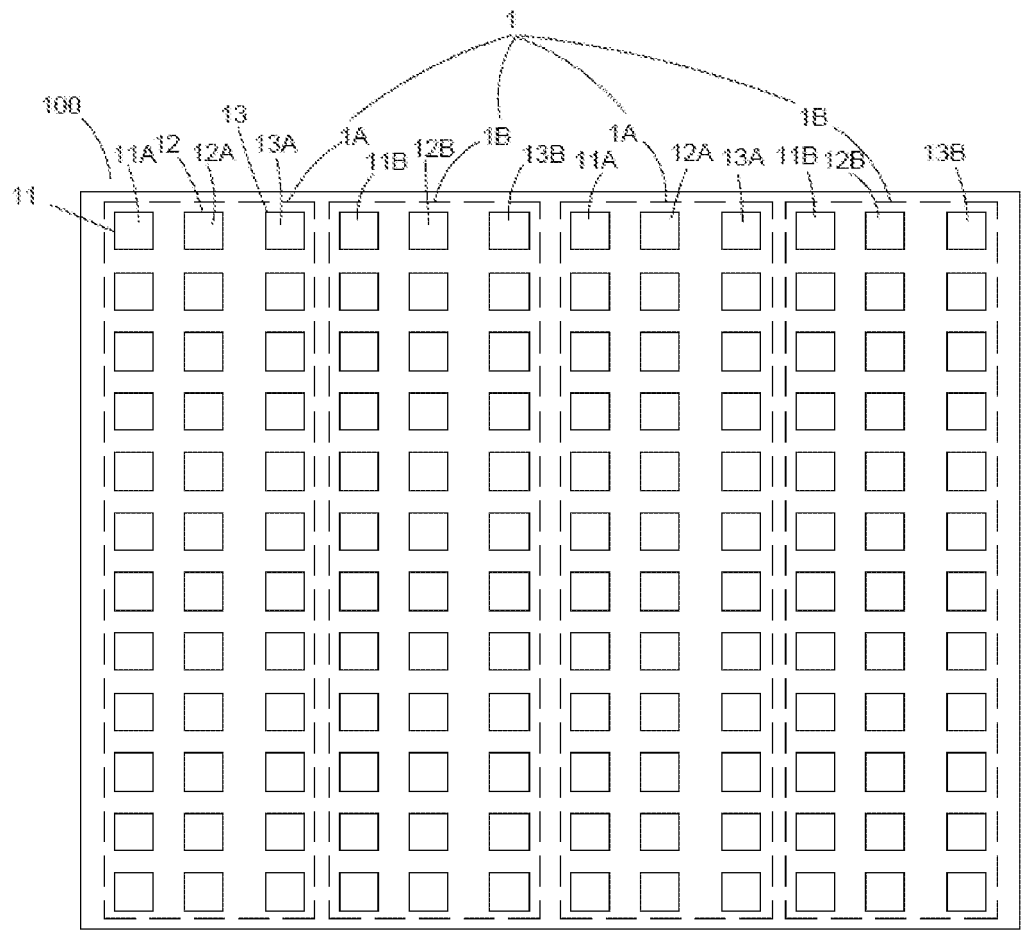
FIG. 1 is a structural schematic diagram of the LED backlight source of the present invention.

As shown in FIG. 1, the present invention provides a backlight module comprising a LED backlight source 100. The LED backlight source 100 comprises at least two LED light source sets 1 disposed alternatively, wherein each LED light source 1 comprises red LED lights 11, green LED lights 12 and blue LED lights 13. The color gamut of the red LED lights 11 in neighbored two LED light sources 1 are different, and the color gamut of the green LED lights 12 in neighbored two LED light sources 1 are different. The red LED lights 11, the green LED lights 12 and the blue LED lights 13 in the two LED light source sets 1 are arranged in a vertical line, respectively. It can be observed from the figure, the red LED lights 11 are arranged in a column, the green LED lights 12 are aligned in a column and the blue LED lights 13 are aligned in a column so that the LED lights are arranged in an array formation.

Specifically, the LED light source 1 is composed of two LED light source sets disposed alternatively. The two LED light source sets are the first LED light source set 1A and the second LED light source set 1B, wherein the first LED light source set 1A is disposed alternatively with the second LED light source set 1B, that is, arranged in the way of horizontally alternating, for example, disposed in the regular sequence of 1A, 1B, 1A, 1B, 1A and 1B.

In the present invention, wavelengths of corresponded red LED lights 11 of the two LED light source sets 1 are the same, wavelengths of corresponded green LED lights 12 of the two LED light source sets 1 are the same, half-peak widths of corresponded red LED lights 11 of the two LED light source sets 1 are different, and half-peak widths of corresponded green LED lights 12 of the two LED light source sets 1 are different.

In order to better distinguish the LED lights in the two LED light source sets, the LED lights in the first LED light source set 1A are defined as the first red LED lights 11A, the first green LED lights 12A and the first blue LED lights 13A, respectively, and the LED lights in the second LED light source set 1B are defined as the second red LED lights 11B, the second green LED lights 12B and the second blue LED lights 13B, respectively.

Specifically, the half-peak widths of the second red LED lights 11B and the second green LED lights 12B are both less than the half-peak widths of the first red LED lights 11A and the first green LED lights 12B, and the wavelengths and the half-peak widths of the first blue LED lights 13A are the same as those of the second blue LED lights 13B.

In the present invention, the first blue LED lights 13A and the second blue LED lights 13B are normal blue LED lights used in the existed technologies, and the wavelengths are 447 nm or 460 nm. However, the present invention is not limited to this, for example, the wavelength can be selected from between 400 nm-470 nm. The first red LED lights 11A are the normal red LED lights in the existed technologies and the wavelength is 630~635 nm, and the second red LED lights 11B are the red LED lights with high color gamut and the wavelength is 630-635 nm. The half-peak width of the second red LED lights 11B is smaller than the half-peak width of the first red LED lights 11A. The first green LED lights 12A are the normal green LED lights in the existed technologies and the wavelength is 530~540 nm, and the second green LED lights 12B are the green LED lights with high color gamut and the wavelength is 530~540 nm. The half-peak width of the second green LED lights 12B is smaller than the half-peak width of the first green LED lights 12A.

Figure 2:
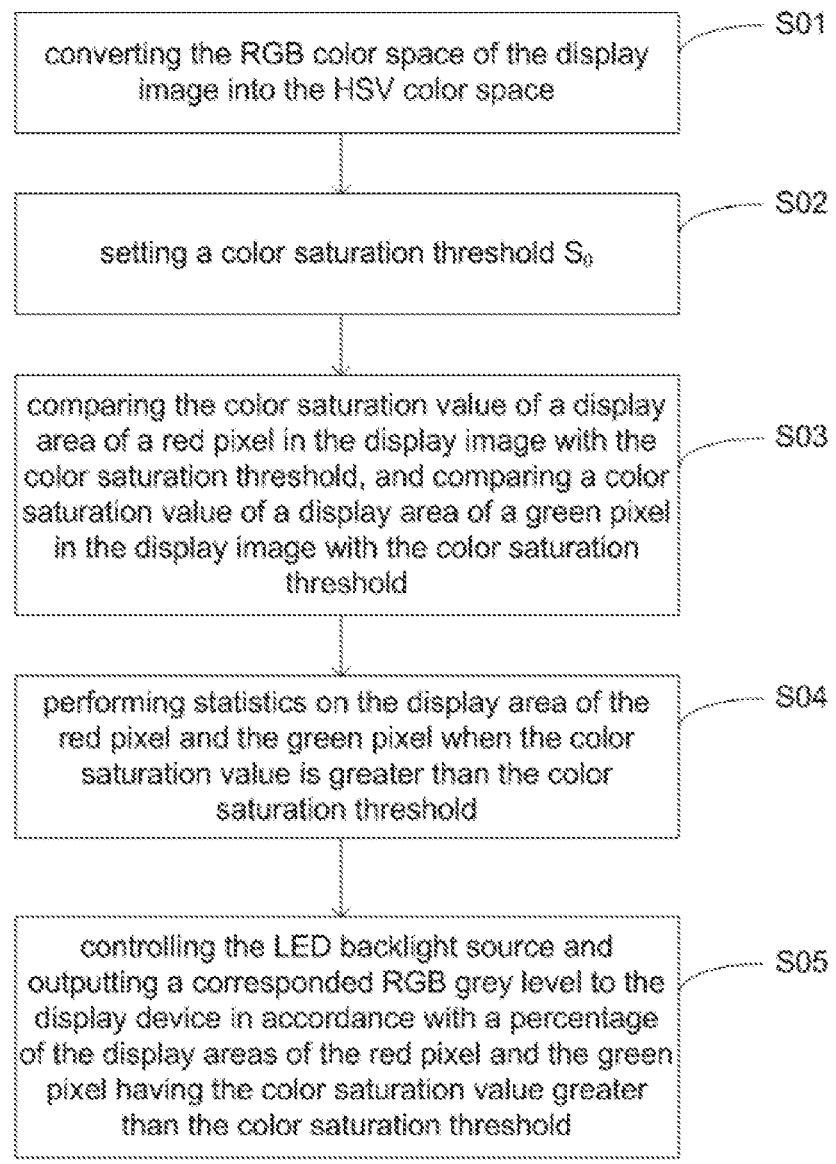
FIG. 2 is a flow chart of the control method of display device of the present invention.

As shown in FIG. 2, the present invention further provides a control method of display device. The display device comprises the backlight module above and are not described again here. The control method comprises the following steps:

S01, inputting a display image and converting the RGB color space of the display image into the HSV color space. The color tone and color saturation value can be obviously observed in the HSV color space; therefore, determinations can be made more directly. The input display image could be a picture or a frame.

S02, setting a color saturation threshold $S_0$ to be 0.8. The color saturation threshold is a basis used for determining whether the color saturation values of the red pixels and the green pixels should be adjusted in the present invention.

S03, comparing the color saturation value of a display area of a red pixel in the display image with the color saturation threshold, and comparing a color saturation value of a display area of a green pixel in the display image with the color saturation threshold.

S04, performing statistics on the display area of the red pixel and the display area of the green pixel when the color saturation value of the display area of the red pixel or the green pixel is greater than the color saturation threshold.

S05, controlling the LED backlight source and outputting a corresponded RGB grey level to the display device in accordance with a percentage of the display areas of the red pixel and the green pixel having the color saturation value greater than the color saturation threshold.

In the step S05, when the percentage of the display areas of the red pixel and the green pixel is less than 10% of the display image, the RGB grey level corresponding to the display image is output directly and the LED backlight source is fully turned on.

when the percentage of the display areas of the red pixel and the green pixel is greater than 10% and less than 50% of the display image, the color saturation values of the display areas of the red pixel and the green pixel each with the color saturation value greater than the color saturation threshold are decreased gradually from a center position to boundaries of the display image, an adjusted RGB grey value corresponding to the display image with the decreased color saturation values of the display areas of the red pixel and the green pixel is calculated and outputted, and the LED backlight source is fully turned on. Specifically, the color saturation values of the display areas of the red pixel and the green pixel each with the color saturation value greater than the color saturation threshold are decreased gradually from the center position to boundaries of the display image to make the color saturation value transits smoothly. And, the color saturation value can be decreased to be less than the color saturation threshold when the color saturation values of the display areas of the red pixel and the green pixel each with the color saturation value greater than the color saturation threshold are decreased gradually from the center position to boundaries of the display image.

When the percentage of the display areas of the red pixel and the green pixel is greater than 50% of the display image, the RGB grey level corresponding to the display image is output directly and the two LED light source sets are turned on. In one of the two LED light source sets, only the blue LED lights are turned on. Another one of the two LED light source sets is fully turned on. The half-peak widths of the red LED lights and green LED lights of the LED light source set being fully turned on are greater than the half-peak widths of the corresponded red LED lights and green LED lights of the LED light source set turning on the blue LED lights only. At the same time, driving currents for driving the red LED lights and green LED lights of the LED light source set being fully turned on are increased to increase luminance of the red LED lights and green LED lights of the selected LED light source set. Specifically, the first blue LED lights 13A of the first LED light source set 1A and the second blue LED lights 13B of the second LED light source set 1B are turned on and the first red LED lights 12A and the first green LED lights 13A of the first LED light source set 1A are turned on at the same time, and the driving currents for driving the first red LED lights 12A and the first green LED lights 13A are increased to increase luminance of the first red LED lights 12A and the first green LED lights 13A.

When the driving currents for driving the red LED lights and green LED lights of the selected LED light source set are increased, the luminance of the red LED lights and green LED lights of the selected LED light source set is increased to two times normal luminance. Specifically, luminance of the first red LED lights 12A and the first green LED lights 13A is increased to two times normal luminance, which is the luminance generated under the same situation in the existed technologies.

Research shows that when the display device displays an image with high color gamut, the human eyes feels uncomfortable to the green and red components, especially red. The possible explanation is that the tone of the high color gamut exceeds the natural color range, causing cognition defects of the human eye in high color gamut. The present invention adopts two kinds of green and red LED lights with different color tones together with a certain display screen adjustment so as to improve the comfort of the human eye to the pictures.

The present invention adopts LED array backlight having three primary colors matched with green and red LED lights in which two different color gamut existed for each color, and makes adjustment in accordance with percentage of the color saturation area in the displayed image. By partially reducing the red and green color saturation of the displayed image or reducing the whole color saturation, the saturated green and red light being uncomfortable to human eyes can be reduced and comfort of human eyes for high color gamut is improved.

Although the present invention is described with reference to the specific embodiments, those with ordinary skill in the art would understand that variations in form or details could be made within the concept and scope of the present invention defined by the claims and equivalents thereto.

What is claimed is:

1. A backlight module, comprising a LED backlight source, wherein: the LED backlight source comprises at least two LED light source sets disposed alternatively; each LED light source set comprises red LED lights, green LED lights and blue LED lights arranged in an array formation; and a color gamut of the red LED lights in a selected one of the LED light source sets and the red lights in one of the LED light source sets neighboring to the selected LED light source set is different, and a color gamut of the green LED lights in the selected LED light source set and the green LED lights in the neighbored LED light source set is different, wherein the backlight source is composed of two LED light source sets, wavelengths of corresponded red LED lights of the two LED light source sets are the same, wavelengths of corresponded green LED lights of the two LED light source sets are the same, half-peak widths of corresponded red LED lights of the two LED light source sets are different, and half-peak widths of corresponded green LED lights of the two LED light source sets are different.

2. The backlight module according to claim 1, wherein the half-peak widths of the red LED lights and the green LED lights of one of the two LED light source sets are both less than the half-peak widths of the red LED lights and the green LED lights of another one of the two LED light source sets.

3. A control method of display device, wherein the display device comprises a backlight module; the backlight module comprises a LED backlight source; the LED backlight source comprises at least two LED light source sets disposed alternatively; each LED light source set comprises red LED lights, green LED lights and blue LED lights arranged in an array formation; and a color gamut of the red LED lights in a selected one of the LED light source sets and the red lights in one of the LED light source sets neighboring to the selected LED light source set is different, and a color gamut of the green LED lights in the selected LED light source set and the green LED lights in the neighbored LED light source set is different;

the control method comprises the steps of:
converting a RGB color space of a display image into a HSV color space;
setting a color saturation threshold $S_0$;
comparing a color saturation value of a display area of a red pixel in the display image with the color saturation threshold, and comparing a color saturation value of a display area of a green pixel in the display image with the color saturation threshold;
performing statistics on the display area of the red pixel and the display area of the green pixel when the color saturation value of the display area of the red pixel or the green pixel is greater than the color saturation threshold; and
controlling the LED backlight source and outputting a RGB grey level to the display device in accordance with a percentage of the display areas of the red pixel and the green pixel with the color saturation value greater than the color saturation threshold.

4. The control method of display device according to claim 3, wherein the backlight source is composed of two LED light source sets.

5. The control method of display device according to claim 4, wherein wavelengths of corresponded red LED lights of the two LED light source sets are the same, wavelengths of corresponded green LED lights of the two LED light source sets are the same, half-peak widths of corresponded red LED lights of the two LED light source sets are different, and half-peak widths of corresponded green LED lights of the two LED light source sets are different.

6. The control method of display device according to claim 5, wherein the half-peak widths of the red LED lights and the green LED lights of one of the two LED light source sets are both less than the half-peak widths of the red LED lights and the green LED lights of another one of the two LED light source sets.

7. The control method of display device according to claim 3, wherein when the percentage of the display areas of the red pixel and the green pixel is less than 10% of the display image, the RGB grey level corresponding to the display image is output directly and the LED backlight source is fully turned on.

8. The control method of display device according to claim 3, wherein when the percentage of the display areas of the red pixel and the green pixel is greater than 10% and less than 50% of the display image, the color saturation values of the display areas of the red pixel and the green pixel each with the color saturation value greater than the color saturation threshold are decreased gradually from a center position to boundaries of the display image, an adjusted RGB grey value corresponding to the display image with the decreased color saturation values of the display areas of the red pixel and the green pixel is calculated and outputted, and the LED backlight source is fully turned on.

9. The control method of display device according to claim 3, wherein, when the percentage of the display areas of the red pixel and the green pixel is greater than 50% of the display image, the RGB grey level corresponding to the display image is output directly and two of the LED light source sets are turned on by only turning on the blue LED lights in one of the two LED light source sets and fully turning on another one of the two LED light source sets; wherein the half-peak widths of the red LED lights and the green LED lights of the LED light source set being fully turned on are greater than the half-peak widths of corresponded red LED lights and green LED lights of the LED light source set turning on only the blue LED lights, and driving currents of the red LED lights and green LED lights of the LED light source set being fully turned on are increased at the same time to increase luminance of the red LED lights and the green LED lights of the LED light source set being fully turned on.

10. The control method of display device according to claim 9, characterized in that the driving currents of the red LED lights and green LED lights of the LED light source set being fully turned on are increased at the same time to increase luminance of the red LED lights and the green LED lights of the LED light source set being fully turned on to at least two times normal luminance.

11. The control method of display device according to claim 3, wherein the color saturation threshold $S_0$ is 0.8.

* * * * *